Oct. 4, 1949.  A. L. LEE  2,483,650
LOADING MACHINE
Filed Aug. 6, 1945  3 Sheets-Sheet 1

INVENTOR;
ARTHUR L. LEE,
BY
ATT'Y.

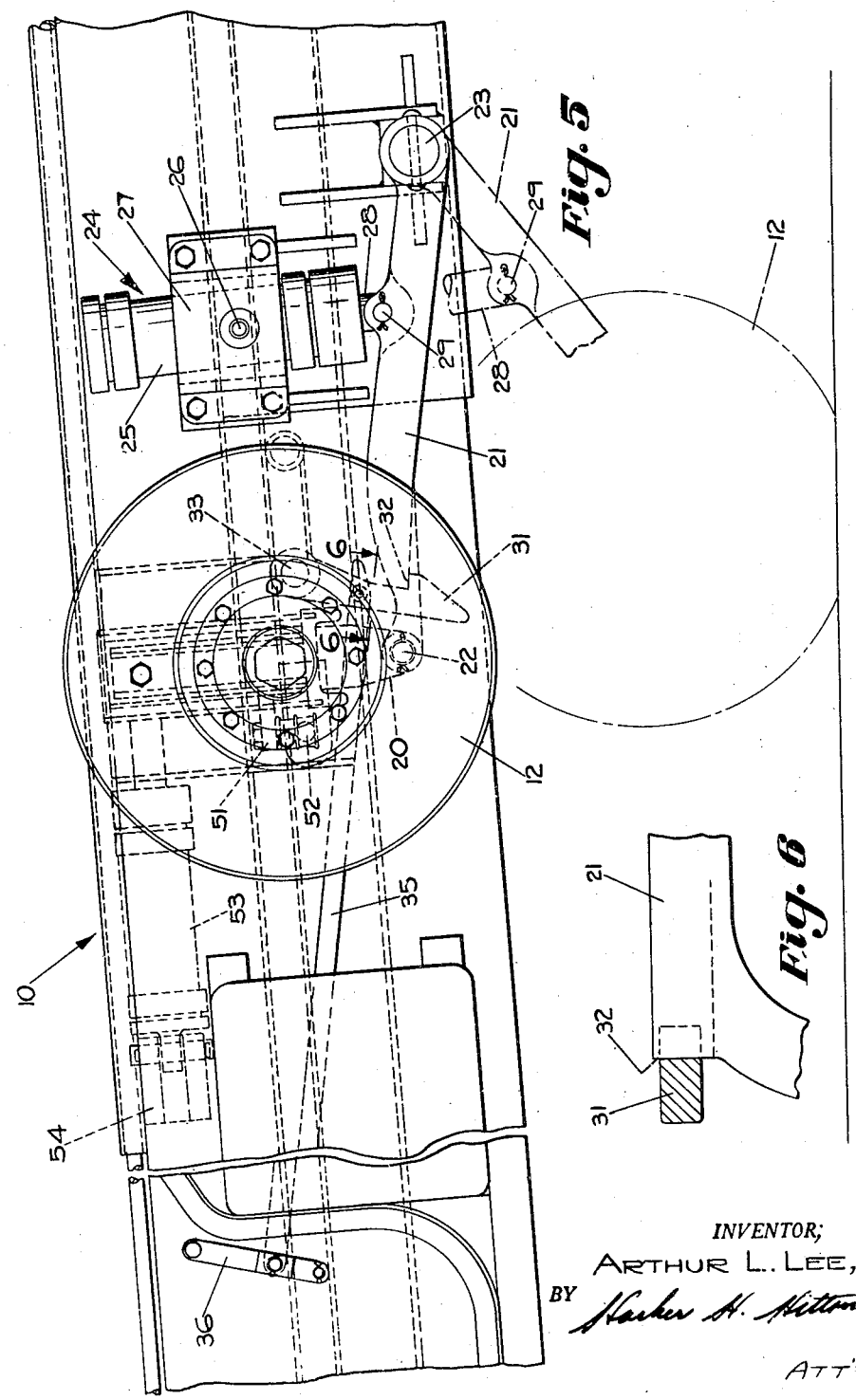

Patented Oct. 4, 1949

2,483,650

UNITED STATES PATENT OFFICE 2,483,650

LOADING MACHINE

Arthur L. Lee, Upper Arlington, Ohio, assignor, by mesne assignments, to The Jeffrey Manufacturing Company, a corporation of Ohio Application August 6, 1945, Serial No. 609,076

10 Claims. (Cl. 180—1)

This invention relates to a loading machine.

An object of the invention is to provide a loading machine with improved steering wheels which may be vertically adjusted relative to the main frame of the machine.

A further object of the invention is to provide a loading machine with steering wheels which may be raised off the ground while one end of the machine is supported for swinging movement independently of said steering wheels.

A further object of the invention is to provide a vehicle with mechanical means for locking or latching vertically adjustable steering wheels independently of their adjusting mechanism.

Other objects of the invention will appear hereinafter, the novel features and combinations being set forth in the appended claims.

In the accompanying drawings,

Fig. 5 is an enlarged side elevational view of one of the steering wheels and associated apparatus; and Fig. 6 is a plan view of a detail taken on the line 6—6 of Fig. 5, looking in the direction of the arrows, a part being shown in section.

This application is a continuation in part of my application for a Loading machine, Serial No. 530,361, filed April 10, 1944, which it follows in structure, except for such differences as are disclosed or apparent. While not particularly important to the invention herein specifically disclosed and claimed, it may be mentioned that the machine preferably follows a modification of my parent case, Serial No. 530,361, which is disclosed in my application for Loading machine, Serial No. 595,047, filed May 21, 1945, now abandoned. It preferably also contains a modification of my parent case Serial No. 530,361, which is disclosed in the application of Sterling C. Moon for Loading machine, Serial No. 607,928, filed July 31, 1945.

The loading machine includes a main frame 10 supported upon a pair of front traction wheels 11 and a pair of rear steering wheels 12. The vehicle is self-propelled and when it is being transported by self-propulsion from one place to another the four wheels 11 and 12 are in contact with the ground, the steering wheels 12 providing for steering of the vehicle.

Figures 1, 2, 3:
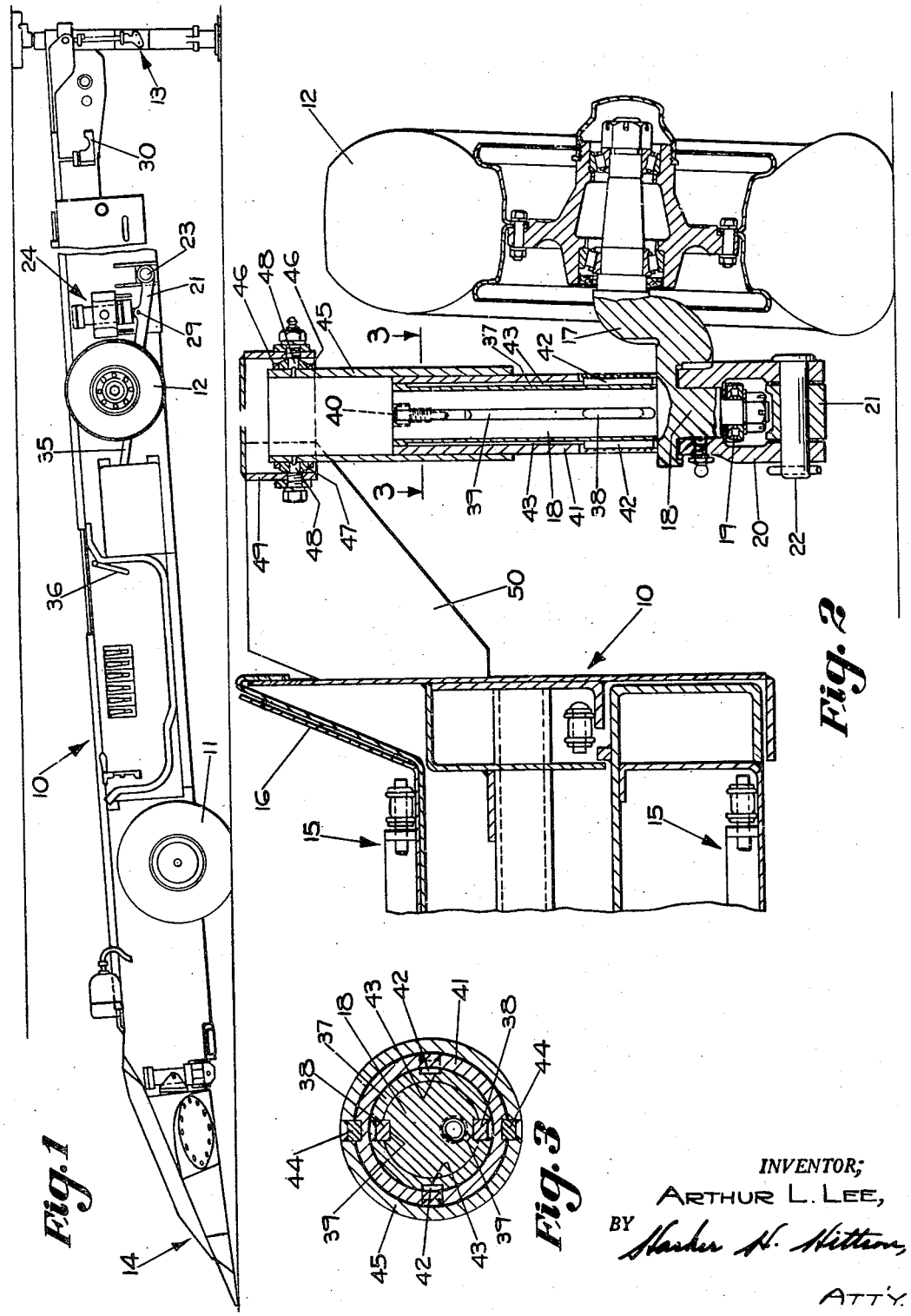
Fig. 1 is a side elevational view of a loading machine incorporating the features of my invention.
Fig. 2 is an enlarged sectional elevational view through one of the steering wheels and adjacent structure, taken on the line 2—2 of Fig. 4, with certain parts omitted in the interest of clearness.
Fig. 3 is a transverse sectional view taken on the line 3—3 of Fig. 2, looking in the direction of the arrows.

When the machine is in operation to load material, the rear end is elevated preferably by lowering the wheels 12, under power, with respect to the main frame 10, whereupon a hydraulic or mechanical jack 13, carried by the rear end of the main frame 10, is swung to its operative position, as illustrated in Fig. 1 of the drawings, and anchored between the floor and roof. This jack 13 provides a pivotal support for the rear end of the main frame 10, after which the steering wheels 12 may be elevated to the positions illustrated in Figs. 1 and 5 of the drawings and there latched in position. Thereafter, the traction wheels 11 are swung inwardly about upright pivots, as disclosed in detail in my parent case Serial No. 530,361, whereupon by operating them the vehicle may be swung in a substantially horizontal plane about the axis of the jack 13.

The loader includes a gathering head 14 provided with a pair of gathering conveyors, as disclosed in detail in my parent case Serial No. 530,361, which gather coal as the head 14 is fed rectilinearly relative to the main frame 10 into a pile of loose or semi-compact coal. This gathered coal is delivered to an endless conveyor 15 which travels over the main frame 10 the working run thereof extending through a trough 16 formed in the top of the main frame 10 and constituting telescoping parts, a portion of which is connected to the head section 14 to reciprocate therewith, the other portion being a stationary part of the main frame 10. Coal received in the trough 16 is conveyed rearwardly by the conveyor 15 and discharged over the tail section of the main frame 10 into a receiving conveyor or other receptacle adjacent the roof jack 13.

To provide for steering of the two wheels 12 while also providing for their relative vertical or up and down adjustment with respect to the main frame 10, requires special construction which is disclosed in detail in the drawings. Each wheel 12 is of substantially the same construction and thus only one of them need be described in detail. Such differences as exist will be specifically mentioned.

Figure 4:
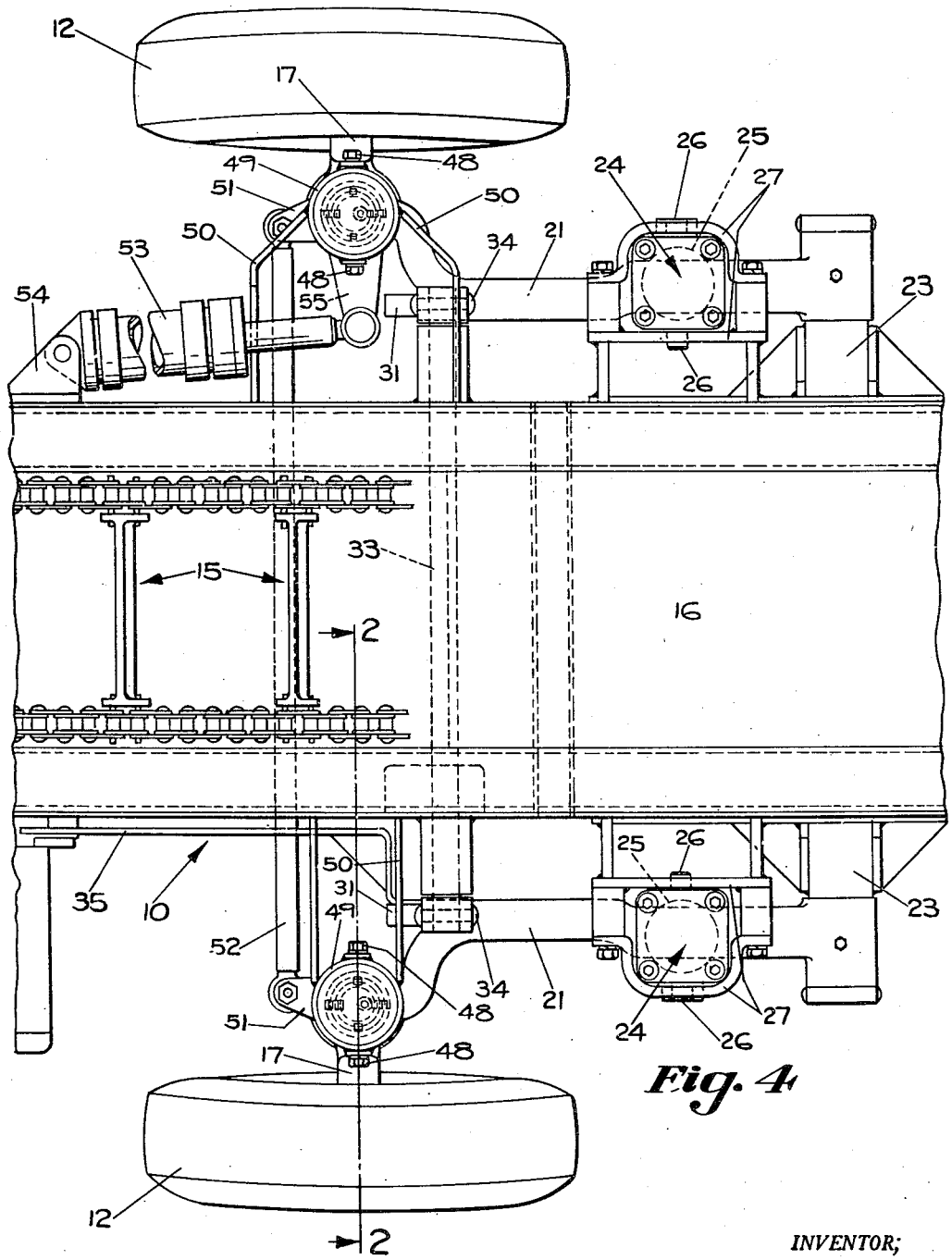
Fig. 4 is an enlarged plan view of the steering wheels of the loading machine and associated apparatus.

Referring particularly to Figs. 2 and 4 of the drawings, it will be seen that each wheel 12 is mounted on a stub axle 17 which is formed as an integral part of an upstanding shaft 18. The lower portion of the shaft 18 is provided with a reduced neck which receives a thrust anti-friction bearing 19 which is received in a bracket 20 through which it transmits the load to the outer end of a heavy pivoted lever or arm 21 which is connected thereto by a pivot pin 22. The arm 21 extends rearwardly from the wheel and is pivotally connected by a stub shaft 23 to the main frame 10.

Up and down adjustment of the wheel 12 is effected by a double acting piston motor 24, the cylinder 25 of which is pivotally supported by trunnions 26 in a bracket 27 provided on the main frame 10. The hydraulic piston motor 24 is of the double acting type and is controlled by a valve which when in its neutral position will trap the fluid on opposite sides of the piston thereof to lock it in any position. Thus, the wheel 12 may be adjusted to various up and down positions relative to the main frame 10 and locked in adjusted position. A piston rod 28 of the piston motor 24 is pivotally connected to the lever or arm 21 by a pivot pin 29.

The up and down adjustment of the wheels 12 relative to the main frame 10 is useful while the machine is being transported, particularly over uneven ground. Furthermore, it provides a self-contained lifting jack for the discharge end of the vehicle so that when the jack 13 is swung from its inoperative or carrying position during which it is supported by a supporting bracket 30, as disclosed in full detail in the above mentioned application of Sterling C. Moon, Serial No. 607,928, to its operative position, as illustrated in Fig. 1, the rear end of the frame 10 may be raised and lowered to aid in anchoring the jack 13. Furthermore, once the jack 13 is anchored and provides pivotal support for the discharge end of the main frame 10, the motors 24 may be actuated to lift the wheels 12 completely off the ground and to the elevated position, as illustrated in Figs. 1 and 5 of the drawings.

In order to relieve the motors 24 of their holding wheels 12 in elevated position, I preferably provide locking or latching means which automatically latch said wheels in said elevated position and which can be released whenever it is desired to lower them. Such latching means includes a pivoted latch 31 (see Fig. 5), which has a rearward notch adapted to receive and support a ledge 32 formed on the arm 21. The two latches 31 are connected together by a cross-rod 33, (see Fig. 4), to opposite ends of which the pair of latches 31 are rigidly attached by rivets 34.

An actuating rod 35 is provided for the two latches 31, such rod 35 extending rearwardly from one of them and being pivotally connected to an operating lever 36 which when operated will release the two latches, permitting the arm 21 to be moved downwardly by the motors 24. The bottom portions of the latches 31 are tapered on their rear faces, as clearly illustrated in Fig. 5 of the drawings, so that when the arms 21 are swung upwardly they will automatically contact these tapered surfaces and swing the latches 31 forwardly against the action of gravity. When the arms 21 reach their uppermost positions, the latches 31 will automatically move under the influence of gravity to swing rearwardly and engage the ledges 32. Thus the elevating or adjusting motors 24 will be relieved of all load by the mechanical latching or locking means when the steering wheels 12 are in their uppermost positions relative to the main frame 10.

The upper portion of the shaft 18 receives a concentric sleeve or tube 37 which is feathered or keyed thereto, since the lower portion thereof is provided with a pair of keys 38 which are welded thereto (see Fig. 3) and which are slidably received in keyways 39 on diametrically opposite sides of said shaft 18. The head of a screw 40 prevents the sleeve 37 coming off the shaft 18 by contacting one of the keys 38 when sleeve 37 is moved upwardly relative to shaft 18 a predetermined amount. It is thus obvious that shaft 18 and tube 37 must rotate together about their coincidental upright axes which is the steering axis of the wheel 12.

A second sleeve or tube 41 is telescopically received by the sleeve 37 and is feathered or keyed to rotate therewith while being adjustable axially or longitudinally, as is the tube 37 with respect to shaft 18. Tube 41 is provided at its bottom with a pair of keys 42 (see Figs. 2 and 3) which are welded thereto and which are slidably received in keyways 43 formed on diametrically opposite sides of the outer surface of the tube 37, keyways 43 terminating short at the top thereof, as clearly illustrated in Fig. 2 of the drawings, to prevent disengagement of tubes 37 and 41 as they are telescopically adjusted to increase their effective length.

The outer surface of the tube 41 is provided with a pair of keyways with which slidable keys 44 cooperate, said keys 44 being carried at the bottom of a concentric tube or sleeve 45 which telescopically receives the chute 41; the keyways in the external surface of said tube 41 terminating short of the top thereof to prevent disengagement of said tubes 41 and 45 as the telescopic adjustment between them is effected.

From the above description it is obvious that tubes 45, 41 and 37 co-operate with the upper portion of the shaft 18 to provide a telescoping adjustment between the tube 45 and the shaft 18 so that relative axial or rectilinear adjustment between them is permitted, while at the same time insuring a rotational or torque driving relation between the tube 45 and the shaft 18 through the intermediary of the tubes 41 and 37. In other words, any steering or rotational movement or torque applied to the tube 45 will produce similar movement of the axle 17 and wheel 12.

The tube 45 is held against axial or up and down movement with respect to the main frame 10 while being mounted for rotational and pivotal movement on a horizontal axis. This mounting is effected as follows. The upper end of the tube 45 carries a pair of axially spaced rings 46 which are rigidly attached to the tube 45 and which receive a split collar or ring 47 mounted in trunnions 48 carried in a bracket ring 49 which is mounted on a supporting bracket 50 rigidly attached to the main frame 10. It is evident that the trunnions provide for swinging or pivotal movement of the tube or sleeve 45 on a horizontal axis, while the spaced rings 46 provide for turning or rotational movement of the tube 45 relative to the ring or split collar 47.

Since the tubes 45 do not move upwardly and downwardly relative to the main frame 10, it is possible to connect said tubes 45 on opposite sides of the frame 10, or, in other words, those individual to each of the two wheels 12, so that the two wheels 12 will move in unison to effect proper steering. To this end each of the tubes 45 is provided adjacent its lower end with a bracket or arm 51 (see Figs. 4 and 5), the two arms 51 being connected by a cross tie-rod 52 which extends through the main frame 10.

Actuation of the steering mechanism is effected by a double acting hydraulic piston motor 53, the cylinder of which is pivotally connected by a bracket 54 to the main frame 10 and the piston rod of which is connected preferably by a ball and socket joint to an operating lever or arm 55 (see Fig. 4) which is rigidly attached near the top of one of the tubes or sleeves 45. It is evident that by rotating one of the sleeves 45 the rotational or torque movement will be transmitted to the other through the tie-rod 52 and arms 51 and that the rotational movement of these two tubes 45 together will be transmitted through their associated telescopic mechanism to the brackets 17, thus swinging the two wheels 12 together to effect steering adjustment thereof.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A device of the class described including a frame, a steering wheel, an axle for said wheel, an upstanding shaft rigidly connected with said axle, means for vertically adjusting said axle, telescoping tubes keyed to rotate with said shaft while vertically adjustable relative thereto, means holding one of said tubes against all up and down movement relative to said frame, and means for rotating said one tube including a member connected to said one tube.

2. A device of the class described including a frame, a steering wheel, an axle for said wheel, an upstanding shaft rigidly connected with said axle, means for vertically adjusting said axle, telescoping tubes keyed to rotate with said shaft while vertically adjustable relative thereto, means holding one of said tubes against all vertical movement relative to said frame, and means for rotating said one tube.

3. In a vehicle, the combination with a frame, vertically adjustable steering wheels on said frame for normally carrying and steering said vehicle, means for steering said wheels, hydraulic motor means for vertically adjusting said wheels relative to said frame, and mechanical means for latching said wheels in at least one position against downward movement.

4. In a vehicle, the combination with a frame, vertically adjustable steering wheels on said frame, means for steering said wheels, hydraulic motor means for vertically adjusting said wheels, mechanical means for latching said wheels in at least one position against downward movement, said steering means including a telescoping torque transmitting connection for each wheel, means interconnecting said telescoping connections whereby they rotate together on their longitudinal axis, and means for rotating one of said telescoping connections, the rotary movement of which is transferred to the other through said connecting means.

5. A machine including an elongated substantially horizontally extending main frame, a pair of steering wheels, one on each side of said main frame, means for raising and lowering said wheels relative to said main frame, means for steering said wheels while in various positions of elevation relative to said main frame, said means including an axle for each wheel mounted for pivotal movement on an upright axis, an upwardly extending shaft rigidly attached to each axle along the axis of rotation thereof and movable upwardly and downwardly with its associated axle and wheel, means telescoping with each shaft and having a driving connection therewith whereby rotation thereof about the axis of the associated shaft will be transmitted to said shaft, each of said telescoping means including a member mounted for rotary movement but held against up and down movement relative to said main frame, crank and tie rod means interconnecting said two members whereby they rotate together about their spaced axes, and means for operating said two members to steer said wheels together.

6. A machine including an elongated substantially horizontally extending main frame, a pair of steering wheels, one on each side of said main frame, means for raising and lowering said wheels relative to said main frame, means for steering said wheels while in various positions of elevation relative to said main frame, said means including an axle for each wheel mounted for pivotal movement on an upright axis, an upwardly extending shaft rigidly attached to each axle along the axis of rotation thereof and movable upwardly and downwardly with its associated axle and wheel, means telescoping with each shaft and having a driving connection therewith whereby rotation thereof about the axis of the associated shaft will be transmitted to said shaft, each of said telescoping means including a member mounted for rotary movement but held against up and down movement relative to said main frame, crank and tie rod means interconnecting said two members whereby they rotate together about their spaced axes, said means for raising and lowering said wheels including hydraulic motor mechanism, and mechanical means for latching said wheels in an elevated position.

7. A machine including an elongated substantially horizontally extending main frame, a pair of steering wheels, one on each side of said main frame, means for raising and lowering said wheels relative to said main frame, means for steering said wheels while in various positions of elevation relative to said main frame, said means including an axle for each wheel mounted for pivotal movement on an upright axis, an upwardly extending shaft rigidly attached to each axle along the axis of rotation thereof and movable upwardly and downwardly with its associated axle and wheel, means telescoping with each shaft and having a driving connection therewith whereby rotation thereof about the axis of the associated shaft will be transmitted to said shaft, each of said telescoping means including a member mounted for rotary movement but held against up and down movement relative to said main frame, crank and tie rod means interconnecting said two members whereby they rotate together about their spaced axes, said means for raising and lowering said wheels including hydraulic motor mechanism, and mechanical means for locking said wheels in one position of adjustment.

8. A vehicle including a longitudinally extending frame, a pair of steering wheels, one on each side of said frame, each of said wheels having a wheel supporting axle, a pair of arms pivoted to said frame, one supporting each axle at one end for up and down movement, hydraulic motor means for adjusting each pivoted arm, means mounting each axle for swinging movement on an upright axis, means interconnecting said axles for movement together including a telescoping upright connector for each axle having an axis of rotation coincidental with one of said upright axes, a cross-rod movable rectilinearly longitudinally but held against substantial up and down movement relative to said frame and interconnecting said telescoping connectors, mechanical means for latching said wheels in one position, and means for actuating said cross-rod to effect simultaneous steering movement of said wheels for various positions of adjustment.

9. A vehicle including a longitudinally extending frame, a pair of steering wheels, one on each side of said frame, each of said wheels having a wheel supporting axle, a pair of arms pivoted to said frame, one supporting each axle at one end for up and down movement, motor means for adjusting each pivoted arm, means mounting each axle for swinging movement on an upright axis, means interconnecting said axles for movement together including a telescoping upright connector for each axle having an axis of rotation coincidental with one of said upright axes, a cross-rod movable rectilinearly longitudinally but held against substantial up and down movement relative to said frame and interconnecting said telescoping connectors, mechanical means for latching said wheels in one position, and means for actuating said cross-rod to effect simultaneous steering movement of said wheels for various positions of adjustment.

10. A vehicle including a longitudinally extending frame, a pair of steering wheels, one on each side of said frame, each of said wheels having a wheel supporting axle, a pair of arms pivoted to said frame, one supporting each axle at one end for up and down movement, motor means for adjusting each pivoted arm, means mounting each axle for swinging movement on an upright axis, means interconnecting said axles for movement together including a telescoping upright connector for each axle having an axis of rotation coincidental with one of said upright axes, a cross-rod movable rectilinearly longitudinally but held against substantial up and down movement relative to said frame and interconnecting said telescoping connectors, and means for actuating said cross-rod to effect simultaneous steering movement of said wheels for various positions of adjustment.

ARTHUR L. LEE.

REFERENCES CITED

The following references are of record in the file of this patent:

UNITED STATES PATENTS

| Number | Name | Date |
|---|---|---|
| 1,290,200 | Holmested | Jan. 7, 1919 |
| 1,636,620 | Berry | July 19, 1927 |
| 1,710,129 | Whitnall | Apr. 23, 1929 |
| 1,810,119 | Bebinger | June 16, 1931 |
| 1,842,604 | Guest | Jan. 26, 1932 |
| 2,181,907 | Moffat et al. | Dec. 5, 1939 |
| 2,326,857 | Holstein | Aug. 17, 1943 |
| 2,360,282 | Russell | Oct. 10, 1944 |

FOREIGN PATENTS

| Number | Country | Date |
|---|---|---|
| 390,901 | Great Britain | Apr. 20, 1933 |